United States Patent
Azuma

(10) Patent No.: US 7,209,639 B2
(45) Date of Patent: Apr. 24, 2007

(54) RECORDING APPARATUS AND RECORDING METHOD

(75) Inventor: Kazuki Azuma, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1049 days.

(21) Appl. No.: 10/330,009

(22) Filed: Dec. 27, 2002

(65) Prior Publication Data

US 2003/0185544 A1 Oct. 2, 2003

(30) Foreign Application Priority Data

Dec. 28, 2001 (JP) ............................. 2001-401677

(51) Int. Cl.
*H04N 5/91* (2006.01)
*H04N 7/26* (2006.01)

(52) U.S. Cl. ........................... 386/80; 386/109

(58) Field of Classification Search .................. 386/46, 386/80, 109–112

See application file for complete search history.

(56) References Cited

U.S. PATENT DOCUMENTS

| | | | |
|---|---|---|---|
| 6,874,130 B1 * | 3/2005 | Baweja et al. | 715/805 |
| 6,931,198 B1 * | 8/2005 | Hamada et al. | 386/46 |
| 2001/0043366 A1 * | 11/2001 | Kameyama | 358/403 |
| 2002/0181935 A1 | 12/2002 | Otana | |

FOREIGN PATENT DOCUMENTS

| | | |
|---|---|---|
| EP | 0 975 163 A2 | 1/2000 |
| EP | 0 984 450 A1 | 3/2000 |
| JP | 6-7378 | 1/1994 |
| JP | 8-17137 | 1/1996 |
| JP | 10-21601 | 1/1998 |
| JP | 11-167770 | 6/1999 |
| JP | 11-191879 | 7/1999 |
| JP | 2000-50186 | 2/2000 |
| JP | 2000-123365 | 4/2000 |
| JP | 2001-184754 | 7/2001 |
| JP | 2001-326865 | 11/2001 |

OTHER PUBLICATIONS

European Search Report dated May 9, 2006 for Appln. No. 02028837.9-2202.
Office Action, dated Apr. 27, 2004, from the Japanese Patent Office for Patent Application No. 2001-401677.

* cited by examiner

Primary Examiner—Thai Q. Tran
Assistant Examiner—Mishawn Dunn
(74) Attorney, Agent, or Firm—Pillsbury Winthrop Shaw Pittman, LLP

(57) ABSTRACT

A program controller decides extension of a broadcast time of the program content according to program information, calculates the total program time period including the extension time period, calculates an optimum recording rate from the total program time period and the recording capacity, sets the recording rate of new contents in an MPEG2 encoder, and sets the recording rate of rerecorded contents in a recompressing processor. The recompressing processor receives a playback stream from the already recorded contents through a media recording unit, recompresses it and creates a rerecording stream at a lowered recording rate. It also receives the new recording stream from the MPEG2 encoder. It sends these two recording streams alternately to the media-recording unit, thereby recording the rerecording stream and new recording stream alternately.

19 Claims, 5 Drawing Sheets

RECORDING APPARATUS AND RECORDING METHOD

CROSS-REFERENCE TO RELATED APPLICATIONS

This application is based upon and claims the benefit of priority from the prior Japanese Patent Application No. 2001-401677, filed Dec. 28, 2001, the entire contents of which are incorporated herein by reference.

BACKGROUND OF THE INVENTION

1. Field of the Invention

The present invention relates to a recording apparatus and method for recording a broadcast program content on a recording medium such as an optical disk.

2. Description of the Related Art

There is a conventional program contents recording/playback apparatus for recording and playing TV programs, which has a recording time period extending function for unexpected extension of a program. This extending function is such that when the available area of a recording medium runs short, already recorded program contents are once read out, compressed and rerecorded, thereby creating available area to record more program contents. The prior art program contents recording/playback apparatus having the recording time period extending function has been explained in Jpn. Pat. Appln. KOKAI Publication No. 2000-123365.

The prior art apparatus is capable of recording and playing at N-times speed (N≧2) and changing a record compressing rate. The apparatus can expand a recordable area by playing and compressing/rerecording the already recorded program contents, simultaneously with recording more program contents in the expanded area. With this apparatus, even if the available area of a recording medium is used up and further recording becomes impossible, an available area can be automatically created and more program contents can be recorded in the expanded available area.

However, the above prior art apparatus creates available area not by recompressing program contents during recording, but recompressing other recorded program contents. Thus, if the user refuses recompression of other recorded program contents (to avoid degradation of the picture quality by the recompression), the recording time period cannot be extended. Further, if the broadcasting time period of a program is extended during recording, it is impossible to extend the recording time period by an even recording rate in the same program. Since the apparatus is not linked to the program extension information, it is impossible to recompress/rerecord the already recorded program contents and record new program contents at an optimum recording rate.

BRIEF SUMMARY OF THE INVENTION

An object of the present invention is to provide a recording apparatus and method capable of automatically recording a part of the recorded program content and a succeeding part of the program content at the same recording rate in a predetermined recording area when broadcast time of the program content is extended during recording the program content, even if the available area of a recording medium becomes insufficient, and capable of the recording program content at an appropriate recording rate by linking with program information.

According to a first aspect of the present invention, there is provided a recording apparatus which records a program content provided together with program information by broadcast, the apparatus comprising:

a receiving unit configured to receive the program content and the program information;

a recording unit configured to record a program content on a recording medium at an arbitrary recording rate, the recording unit having an ordinal recording mode for recording at an actual time period and a high speed recording mode for recording at a speed faster than the actual time period;

a first detecting unit configured to detect a recording capacity of the recording medium;

a second detecting unit configured to detect an extension of a broadcast time of the program content based on the program information to set a program extension mode;

a recording rate deciding unit including a determining unit configured to determine an extension time period in the program extension mode, a calculating unit configured to calculate a recording time period based on the extension time period and a preset recording time period and a deciding unit configured to decide a recording rate based on the program recording time period and the recording capacity;

a first control unit configured to make the program content record on the recording medium by setting the recording unit to the ordinal recording mode;

a second control unit configured to set the recording unit to the high speed mode in the program extension mode;

a third control unit configured to, in the set high speed mode, re-compress and re-record program content previously recorded on the recording medium at the recording rate to form an available area, and to compress and record a successive part of the program content on the available area at the recording rate.

According to a second aspect of the present invention, there is provided a recording method of recording a program content on a recording medium using a recording apparatus, the program content being broadcasted together program information, the method comprising:

receiving the program content and the program information;

detecting a recording capacity of the recording medium;

detecting extension of a broadcast time of the program content based on the program information to set a program extension mode to the recording apparatus;

deciding a recording rate by determining an extension time period in the program extension mode, calculating a recording time period based on the extension time period and a preset recording time period and deciding a recording rate based on the program recording time period and the recording capacity;

recording a program content on a recording medium an arbitrary recording rare in an ordinal recording mode for recording at an actual time period;

setting a high speed recording mode for recording at a speed faster than the actual time period in the program extension mode;

re-compressing and re-recording the program content previously recorded on the recording medium at the recording rate to form an available area, in the set high speed recording mode, and compressing and recording a successive part of the program content on the available area at the recording rate.

The apparatus and method comprised as above permits extension of a recording time period at an even recording rate in the same program when a broadcast time of a program content is extended during recording, even if the available area of a recording medium becomes insufficient. Since recompressing creates available area and the recording program content during recording, the other recorded program content is not affected. Further, as the program information is linked, it is possible to recompress and rerecord a part of the recorded program contents and a succeeding part of the program content at an appropriate recording rate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Hereinafter embodiments of the present invention will be explained in detail with reference to the accompanying drawings.

(First Embodiment)

Figure 1:
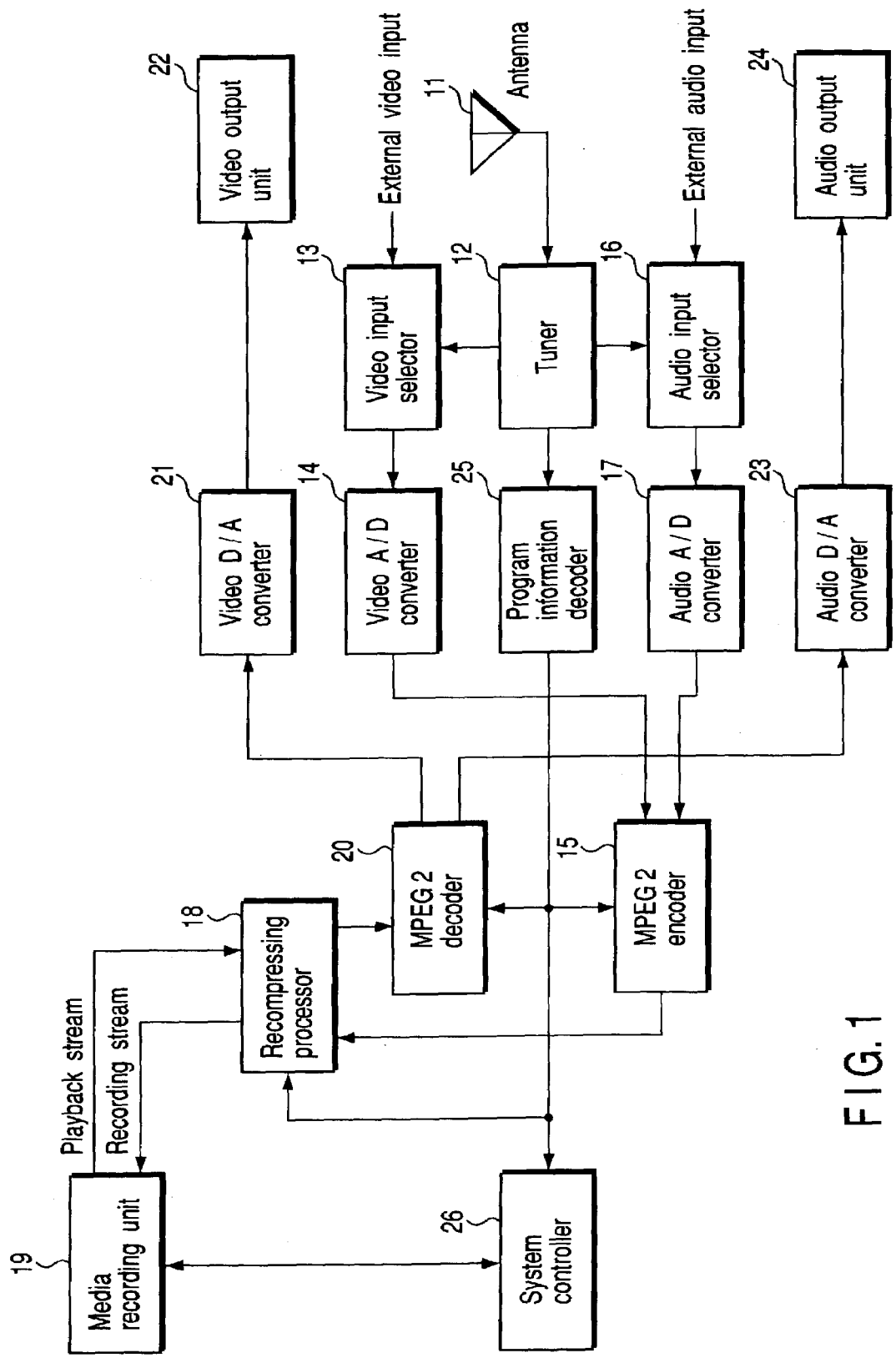
FIG. 1 is a block diagram showing the construction of a program contents recording/playback apparatus according to a first embodiment of the present invention.

FIG. 1 is a block diagram showing the construction of a program contents recording/playback apparatus according to a first embodiment of the present invention. In FIG. 1, an antenna 11 receives a broadcast signal. A tuner 12 tune a broadcast signal received by an antenna 11, and program contents comprising a video signal, an audio signal and a data signal are received and detected. The video signal is supplied to a video A/D (Analog/Digital) converter 14 through a video input selector 13, where it is converted into a digital signal of specified format and becomes a video stream. The audio signal is supplied to an audio A/D converter 17 through an audio input selector 16, where it is converted into a digital signal of specified format and becomes an audio stream. The above video stream and audio stream are supplied to MPEG2 (Moving Picture Experts Group Phase 2) encoder 15.

The above video input selector 13 and audio input selector 16 are used for selecting and outputting external video input and external audio input, instead of a broadcast receiving system.

The above MPEG2 encoder 15 compresses and encodes the video stream and audio stream based on the MPEG2 standard. The compressed and encoded MPEG signal is appropriately compressed by a recompressing processor 18, and sent as a recording stream to a media-recording unit 19. The media-recording unit 19 has an ordinal recording mode for recording at an actual time period and a high-speed recording mode for recording at a speed faster than the actual time period. The media-recording unit 19 is a hard disk drive unit, for example, and makes the recording stream record-able and playable at N-times speed (N≧2).

The record stream played by the above media recording unit 19 is extended by the recompressing processor 18, and sent back to the video stream and audio stream by a MPEG2 decoder 20. The video stream is converted into an analog video signal by a video D/A converter 21, and sent to a display (not shown) through a video output unit 22. The audio stream is converted into an analog audio signal by an audio D/A converter 23, and sent to an audio playback unit (not shown) through an audio output unit 24.

The above data signal is multiplexed during a blanking interval of a television signal, and contains the information of a teletext broadcast and other programs provided by a broadcasting station (hereinafter referred to as program information). This program information includes program start/end information, program ID information and so on. The tuner 12 separates the above data signal from a television signal and demodulates it. This data signal is supplied to a program information decoder 25.

The program information decoder 25 extracts the information about programs from the demodulated data signal. The extracted information is supplied to a system controller 26. The system controller 26 generally controls each processing operation of the apparatus, and has the function of controlling the operations of the MPEG2 encoder 15, MPEG2 decoder 20 and recompressing processor 18, based on the program information supplied from the program information decoder 25. The system controller 26 make record the program content on the recording medium by setting the media-recording unit 19 to the ordinal recording mode following users recording instruction.

Figure 2:
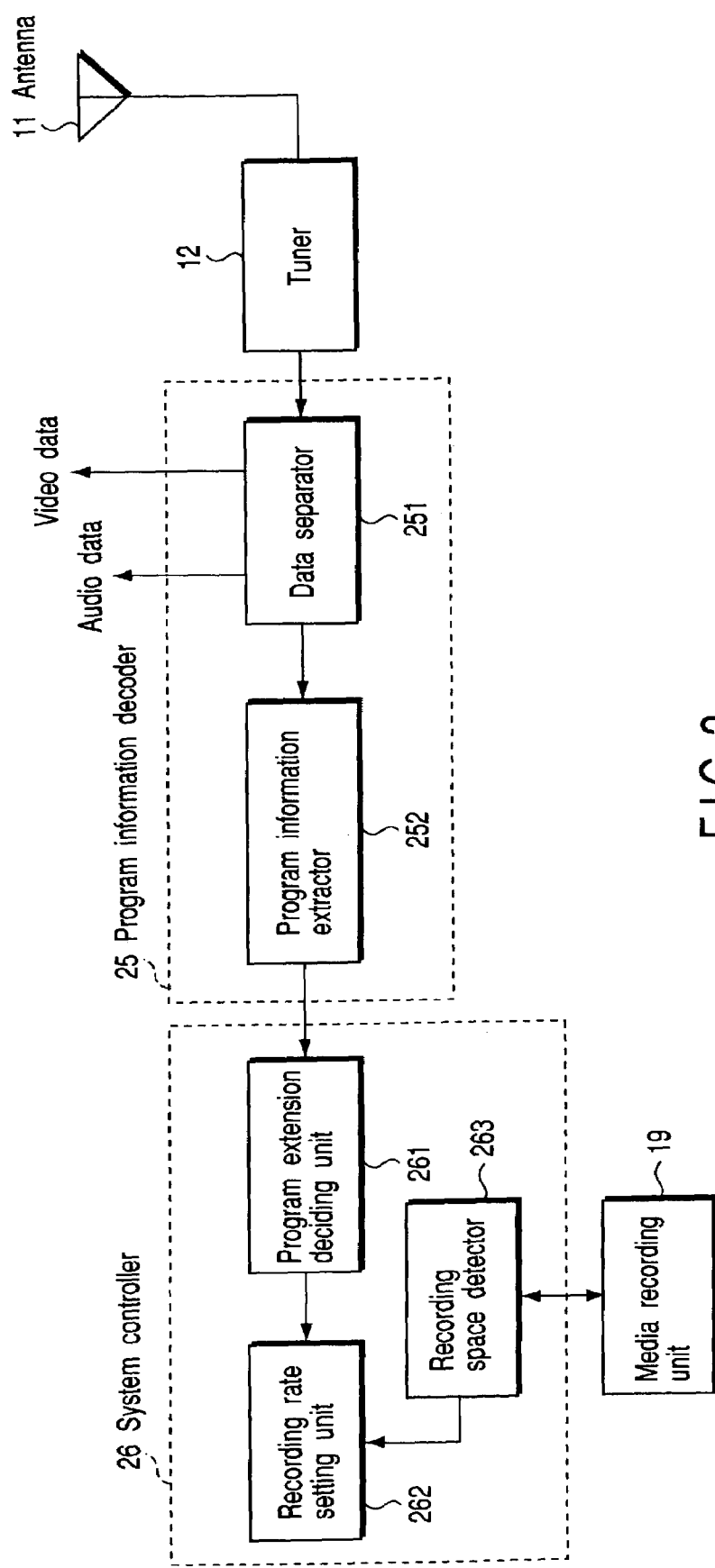
FIG. 2 is a block diagram showing the concrete structure of a program information decoder and a system controller of the first embodiment.

The program information decoder 25 and system controller 26 from a nucleus of the present invention, which realizes the operations upon extension of a broadcast time of program content (referred to as extension of the program hereinafter). FIG. 2 illustrates the concrete structure of the program information decoder 25 and system controller 26. The hardware construction is shown in the drawing, but it is possible to realize it by software.

When the data signal is received from the tuner 12, a data separator 251 in the program information decoder 25 separates video data, audio data and program information data from the received data signal. Among these data, the program information data is supplied to a program information extractor 252. The program information extractor 252 extracts the program start/end information and program ID information from the program information data. The extraction result is sent to a program extension-deciding unit 261 in the system controller 26.

The program extension-deciding unit 261 decides extension of a program based on the input information. The unit 261 sets a program extension mode when the extension of a program is decided, calculates the total program time period including the extension time period, and sends it to a recording rate-setting unit 262. a recording space detector 263 detects a recording space of the media via the media-recording unit 19. The detected recording space value is send to the recording rate-setting unit 262. The recording rate-setting unit 262 determines the recording rate based on the total program time period and the recording space allocated to that program. The system controller 26 sends the MPEG2 encoder 15 a command to set the recording rate of a new recording part, and sends the recompressing processor 18 a command to set the recording rate of a rerecording part.

The recompressing processor 18 receives the playback stream from the recorded part, recompresses it and creates a rerecording stream at a lowered recording rate. It also receives the data of the new record part from the MPEG2 encoder 15. The recompressing processor 18 sends these two record streams alternately to the media-recording unit 19. The media-recording unit 19 is setting to the high-speed mode in the program extension mode, and records the rerecording stream and new recording stream alternately at the same recording rate.

Figure 3:
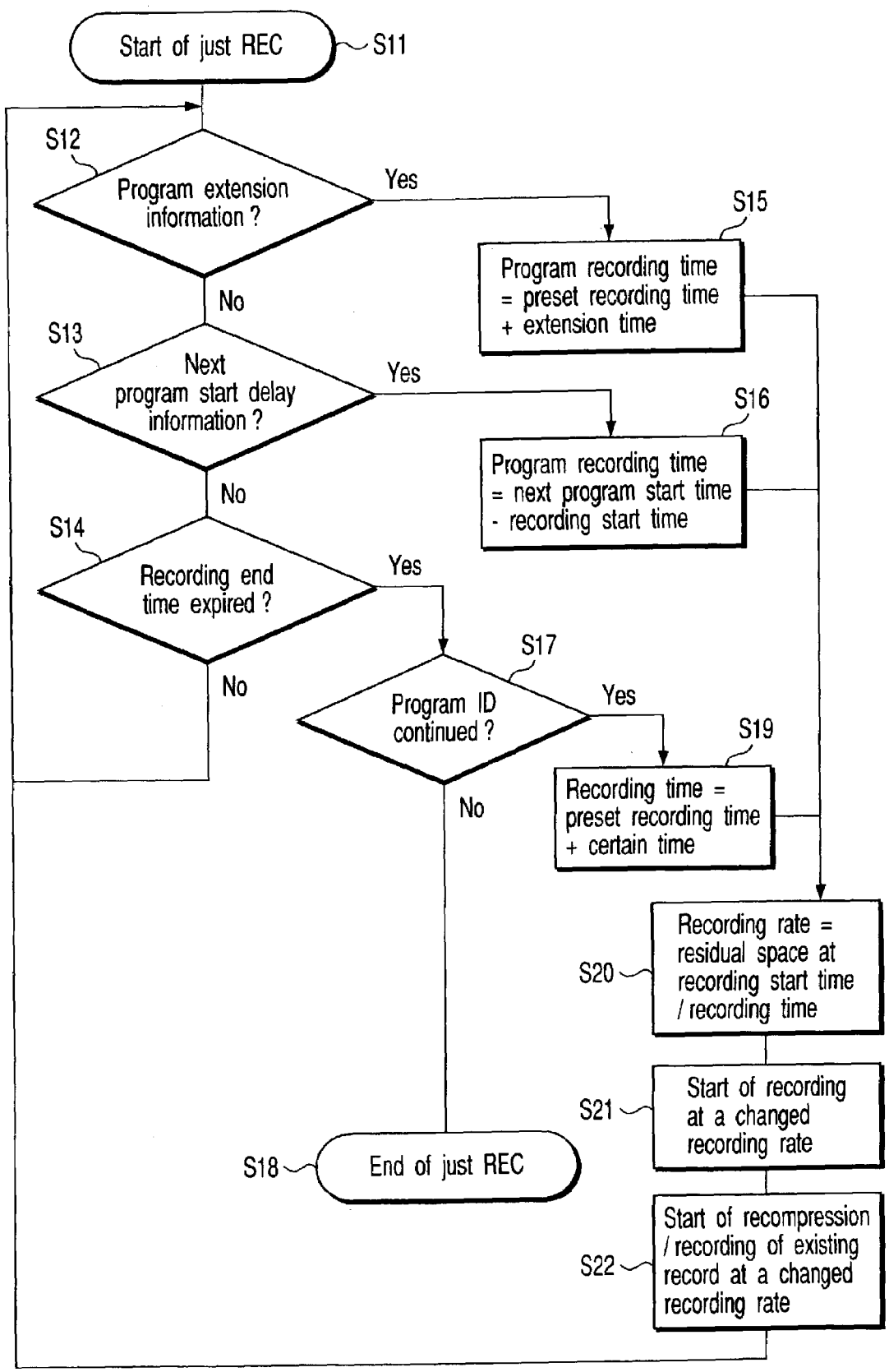
FIG. 3 is a flowchart showing a program extension algorithm of the first embodiment.

Next, description will be given of the decision of extension of a program, with reference to the program extension algorithm shown in FIG. 3.

In step S11, just REC (Recording) mode is set for the recording rate in timer recording mode, where all available area on a recording medium is used. This is the setting for recording with the highest picture quality by fully using the recording time period. In this case, if a program is extended during recording, it is impossible to record the program to the end with the recording rate set at the start of recording. Therefore, it is necessary to always check whether a program is extended during execution of timer recording. This check is performed in steps S12, S13 and S14.

First, program extension information sent from a broadcasting station is checked. This check is performed in step S12. A program ID to identify each program is usually sent from a broadcasting station. Thus, extension information for the program ID is checked. In this case, the program recording time period=recording setting time period+extension time period is decided in step S15.

The second check is not the program extension information, but the information on the next program start time sent from a broadcasting station. This check is performed in step S13. In this case, whether the program start information for the next program ID differs from the recording start time, is always checked during recording. When different next program start time information is sent from a broadcasting station, it is judged as extension of a program. In this case, the program recording time period=next program start time− recording start time is decided in step S16.

The third check is neither the program extension information nor the next program start time delay information. Checking whether a program ID for the program under recording continues even after expiration of the preset recording end time. This check is performed in steps S14 and S17. In this case, if step 17 checks that the program ID is not continuing after expiration of the preset recording end time, it is considered that the program is finished, and terminates the just REC mode in step S18. If step S17 checks that the program ID is continuing, it is considered that the program being recorded is extended.

However, in this case, the program extension time period is not obtained from the program information, and the preset extension time period is taken as a recording extension time period. For example, a broadcast program is often constructed in units of at least 15 minutes, and the extension setting time period is set to 15 minutes. In this case, the program recording time period=recording setting time period+certain time period (e.g., 15 minutes) is determined in step S19. When the program ID continues even after expiration of the certain time period, it is considered to be another program extension, and the recording time period is extended again. This process is realized by returning to step S12 in the algorithm of FIG. 3.

When it becomes necessary to extend the recording time period as described above, the optimum recording rate is calculated in step S20. In this case, the optimum recording rate=residual recordable space at the start of recording/recording time period. Based on this equation, in step S21, a recording rate is changed and a new rate is adopted for new recording. In step S22, the already recorded program contents are recompressed and rerecorded at the new recording rate.

As described above, according to the program contents recording/playback apparatus of this embodiment, even when the available area of a recording medium becomes insufficient due to extension of a program being recorded, the recording time period can be extended with an even recording rate in the same program. Further, the program contents are recompressed and rerecorded to ensure the available area during recording, the user's demand to hold the already recorded program contents without affecting other recorded program contents, can be satisfied. Further, as the program extension information is linked, it is possible to recompress/rerecord the already recorded program contents and record new program contents at the optimum recording rate.

(Second Embodiment)

Figure 4:
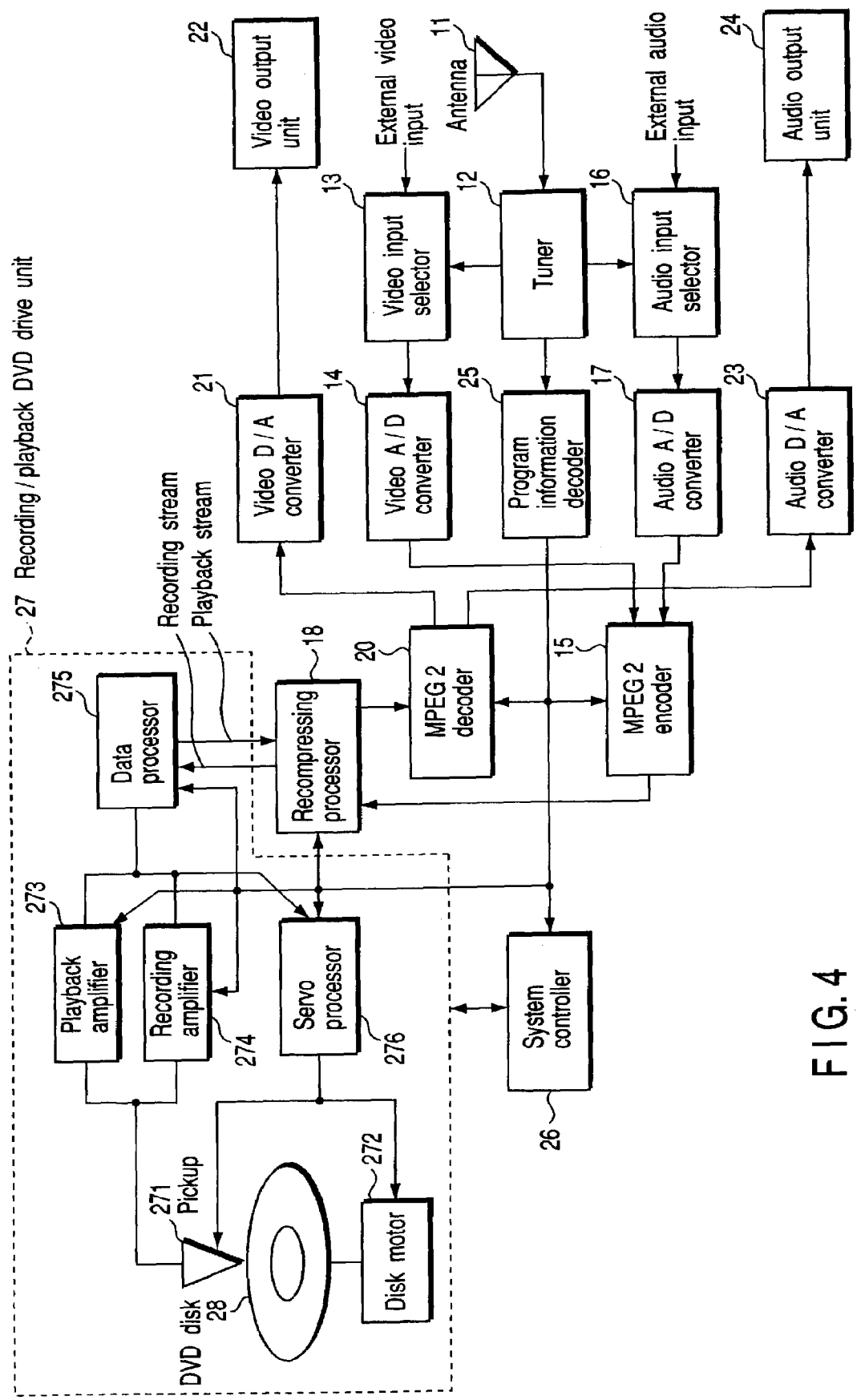
FIG. 4 is a block diagram showing the construction of a program contents recording/playback apparatus utilizing a recording/playback DVD (Digital Versatile Disk) drive unit according to a second embodiment of the present invention.

FIG. 4 is a block diagram showing the construction of a program contents recording/playback apparatus utilizing a recording/playback DVD drive unit 27 as a second embodiment. In FIG. 4, the same reference numerals are given to the same components as those in FIG. 1, and only the different components will be explained hereinafter.

In the playback mode, the recording/playback DVD drive unit 27 shown in FIG. 4 reads a pit string from a DVD recording medium 28 and converts it into an electrical signal by a pickup 271, and amplifies it into a digital signal by a playback amplifier 273. This signal is taken out as a playback stream by a data processor 275, and sent to the recompressing processor 18.

In the recording mode, the recording stream created by the recompressing processor 18 is converted into the DVD record logic format by a data processor 275, and sent to a recording amplifier 274. This signal is picked up and recorded as a pit string on a DVD recording medium 28.

The system controller 26 detects playback and recording sector information of the DVD recording medium 28. Based on this sector information, a servo processor 276 controls a disk motor 272 and a pickup 271, and moves the pickup 271 to the object sector on the DVD recording medium 28.

The processing capability of the recording/playback DVD drive unit 27 has been rapidly increased, and is now capable of recording and playing at double speed. Therefore, recompressing and rerecording become possible between the unit 27 and the recompressing processor 18, by recording and playing alternately at a speed twice as fast as than a normal speed. The actual signal processing is the same as that in the first embodiment.

(Third Embodiment)

Figure 5:
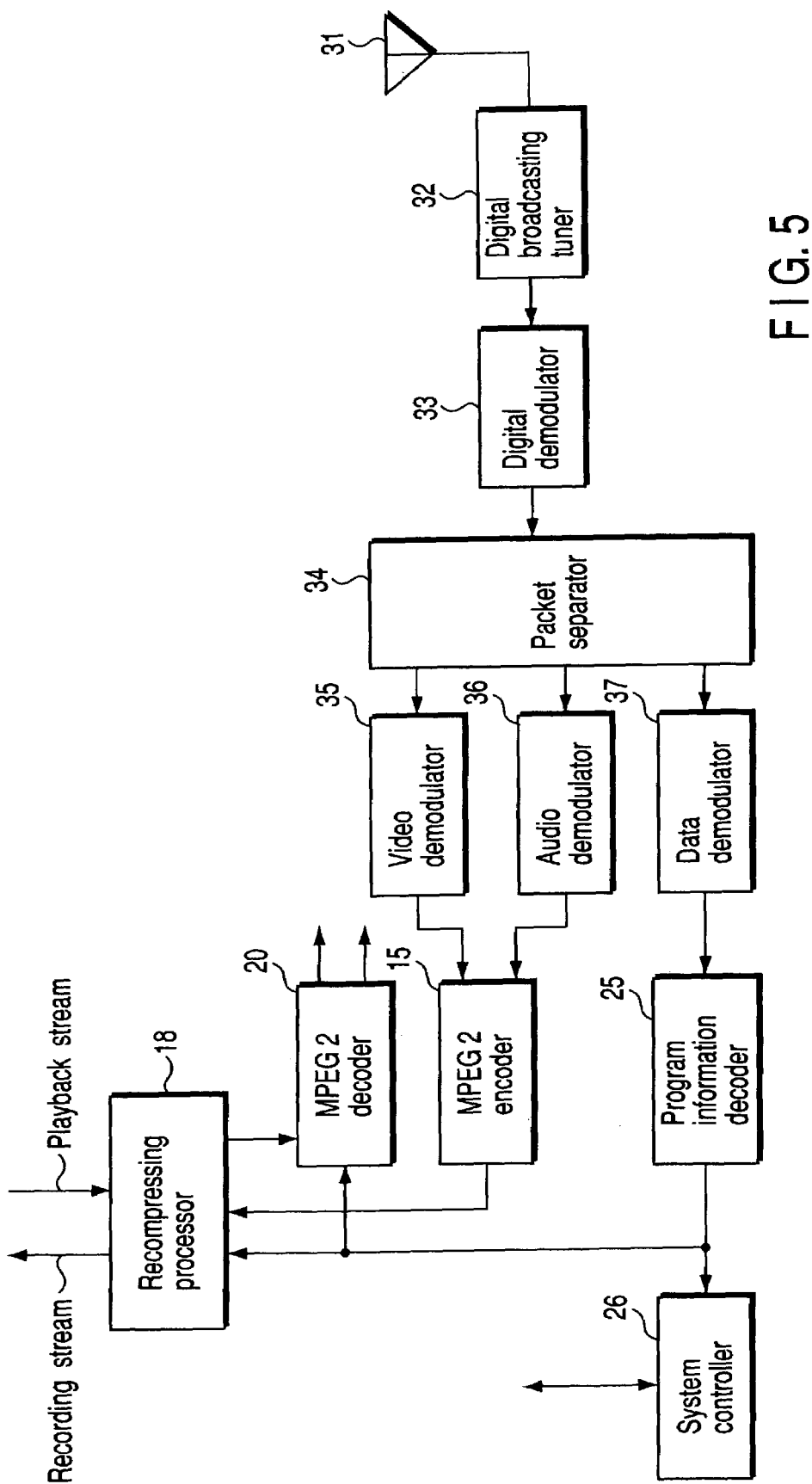
FIG. 5 is a block diagram showing the construction of a program contents recording/playback apparatus applied to digital broadcasting, according to a third embodiment of the present invention.

FIG. 5 is a block diagram showing the construction of a program contents recording/playback apparatus applied to digital broadcasting as a third embodiment. In FIG. 5, the same reference numerals are given to the same components as those in FIG. 1, and the construction is partially omitted.

As shown in FIG. 5, the digital broadcast signal is received by an antenna 31, and tuned by a digital broadcast tuner 32. The tuned digital broadcast signal is demodulated by a digital demodulator 33, thereby a TS (Transport Stream) packet is extracted. The TS packet is applied to a packet separator 34, where it is separated into a video packet, an audio packet and a data packet, and these packets are applied to a video demodulator 35, an audio demodulator 36 and a data demodulator 37, respectively, where they are demodulated and output. As these video and audio outputs are digital signals, they can be applied to the MPEG2 encoder 15 and converted into MPEG signals without passing through an A/D converter.

In digital broadcasting, program ID and program start/end time information are sent together with video and audio data as service information (SI), as a part of the control data constituting a program. Thus, the data demodulator 37 extracts the SI information from the demodulation data, discriminates the program related information, and supplies it to a program information decoder 25. The other processing is the same as those in the first and second embodiments, and the program contents can be recompressed and rerecorded at the optimum recording rate in a specified recording area.

The present invention is not to be limited to the above-mentioned embodiments. The invention may be embodied in other specific forms, for example, apparatus that use a semiconductor memory as a recording medium, as well as a hard disk and DVD.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording apparatus which records a program content provided together with program information by broadcast, said apparatus comprising:
   a receiving unit configured to receive the program content and the program information;
   a recording unit configured to record a program content on a recording medium at an arbitrary recording rate, the recording unit having an ordinal recording mode for recording at an actual time period and a high speed recording mode for recording at a speed faster than the actual time period;
   a first detecting unit configured to detect a recording capacity of the recording medium;
   a second detecting unit configured to detect an extension of a broadcast time of the program content based on the program information to set a program extension mode;
   a recording rate deciding unit including a determining unit configured to determine an extension time period in the program extension mode, a calculating unit configured to calculate a recording time period based on the extension time period and a preset recording time period and a deciding unit configured to decide a recording rate based on the program recording time period and the recording capacity;
   a first control unit configured to make the program content record on the recording medium by setting the recording unit to the ordinal recording mode;
   a second control unit configured to set the recording unit to the high speed mode in the program extension mode;
   a third control unit configured to, in the set high speed mode, re-compress and re-record program content previously recorded on the recording medium at the recording rate to form an available area, and to compress and record a successive part of the program content on the available area at the recording rate.

2. The apparatus according to claim 1, wherein
   when the program information contains extension time period information,
   the determining unit extracts the extension time period information from the program information to detect the extension time period.

3. The apparatus according to claim 1, wherein
   when the program information contains start time information of a program content next to the program content,
   the determining unit extracts the start time information from the program information to detect the extension time period.

4. The apparatus according to claim 1, wherein
   when the program information contains program identification information of the program content,
   the second detecting unit extracts the program identification information from the program information, and determines the extension by presence of the program identification information before and after a preset program end time of the preset recording time period.

5. The apparatus according to claim 4, wherein
   the calculating unit has a defined value as a preset recording time period, sets the program recording time period to the defined value when the extension is detected, and re-sets the defined value when the extension is detected after the recording time period set to the defined value expires.

6. The apparatus according to claim 1, wherein
   when the program content is included in analog television broadcast signals,
   the receiving unit receives the program information from a data signal superimposed on a blanking interval of a video signal in the analog television broadcast signals.

7. The apparatus according to claim 1, wherein
   when the program contents is included in digital television broadcast signals,
   the receiving unit receives the program information from service information included in control data in the digital television broadcast signals.

8. A recording method of recording a program content on a recording medium using a recording apparatus, the program content being broadcasted together program information, said method comprising:
   receiving the program content and the program information;
   detecting a recording capacity of the recording medium;
   detecting extension of a broadcast time of the program content based on the program information to set a program extension mode to the recording apparatus;
   deciding a recording rate by determining an extension time period in the program extension mode, calculating a recording time period based on the extension time period and a preset recording time period and deciding a recording rate based on the program recording time period and the recording capacity;
   recording a program content on a recording medium an arbitrary recording rare in an ordinal recording mode for recording at an actual time period;

setting a high speed recording mode for recording at a speed faster than the actual time period in the program extension mode;

re-compressing and re-recording the program content previously recorded on the recording medium at the recording rate to form an available area, in the set high speed recording mode, and compressing and recording a successive part of the program content on the available area at the recording rate.

9. The method according to claim 8, wherein when the program information contains extension time period information, determining the extension time period extracts the extension time period information from the program information to detect the extension time period.

10. The method according to claim 8, wherein when the program information contains start time information of a program content next to the program content, determining the extension time period extracts the start time information from the program information to detect the extension time period.

11. The method according to claim 8, wherein when the program information contains program identification information of the program content, detecting the extension includes extracting the program identification information from the program information, and determining the extension by presence of the program identification information before and after a the preset program end time of the preset recording time period.

12. The method according to claim 11, wherein calculating the recording time period includes determining a defined value as a preset recording time period, setting the program recording time period to the defined value when the extension is detected, and re-setting the defined value when the extension is detected after the recording time period set to the defined value expires.

13. The method according to claim 8, wherein when the program content is included in analog television broadcast signals, receiving the program information includes receiving the program information from a data signal superimposed on a blanking interval of a video signal in the analog television broadcast signals.

14. The method according to claim 8, wherein when the program content is included in digital television broadcast signals, receiving the program information includes receiving the program information from service information included in control data in the digital television broadcast signals.

15. A recording apparatus which records a program content provided together with program information by broadcast, said apparatus comprising:

means for receiving the program content and the program information;

means for recording a program content on a recording medium at an arbitrary recording rate, the recording means having an ordinal recording mode for recording at an actual time period and a high speed recording mode for recording at a speed faster than the actual time period;

first detecting means for detecting a recording capacity of the recording medium;

second detecting means for detecting extension of a broadcast time of the program content based on the program information to set a program extension mode;

recording rate deciding means including means for determining an extension time period in the program extension mode, means for calculating a recording time period based on the extension time period and a preset recording time period and means for deciding a recording rate based on the program recording time period and the recording capacity;

first control means for making the recording means record the program content on the recording medium by setting the recording means to the ordinal recording mode;

second control means for setting the recording means to the high speed recording mode in the program extension mode;

third control means for, in the set high speed recording mode, making the recording means re-compress and re-record the program content previously recorded on the recording medium at the recording rate to form an available area, and for making the recording means compress and record a successive part of the program content on the available area at the recording rate.

16. The apparatus according to claim 15, wherein when the program information contains extension time period information, the determining means extracts the extension time period information from the program information to detect the extension time period.

17. The apparatus according to claim 15, wherein when the program information contains start time information of a program content next to the program content, the determining means extracts the start time information from the program information to detect the extension time period.

18. The apparatus according to claim 15, wherein when the program information contains program identification information of the program content, the second detecting means extracts the program identification information from the program information, and determines the extension by presence of the program identification information before and after a preset program end time of the preset recording time period.

19. The apparatus according to claim 18, wherein the calculating means has a defined value as a preset recording time period, sets the program recording time period to the defined value when the extension is detected, and re-sets the defined value when the extension is detected after the recording time period set to the defined value expires.

* * * * *